M. FREUD.
SHOP WINDOW FRAME.
APPLICATION FILED MAR. 11, 1911.
1,066,806.
Patented July 8, 1913.
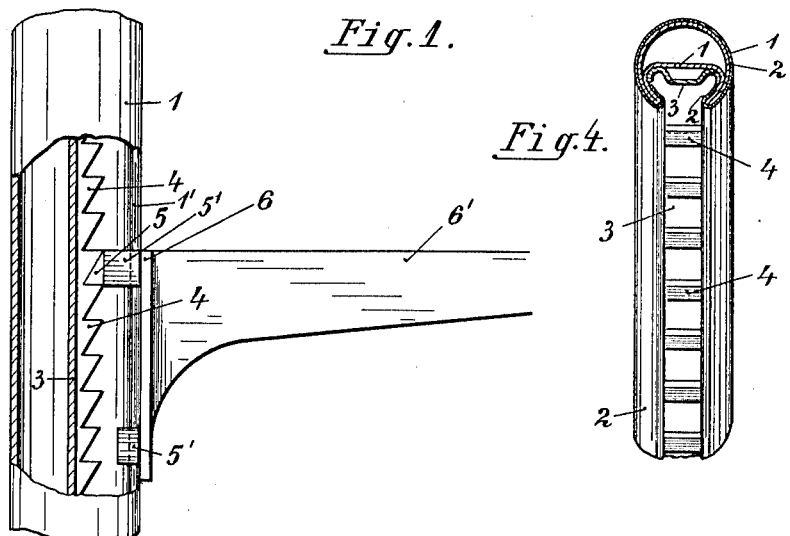
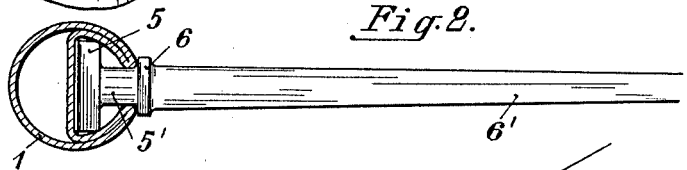
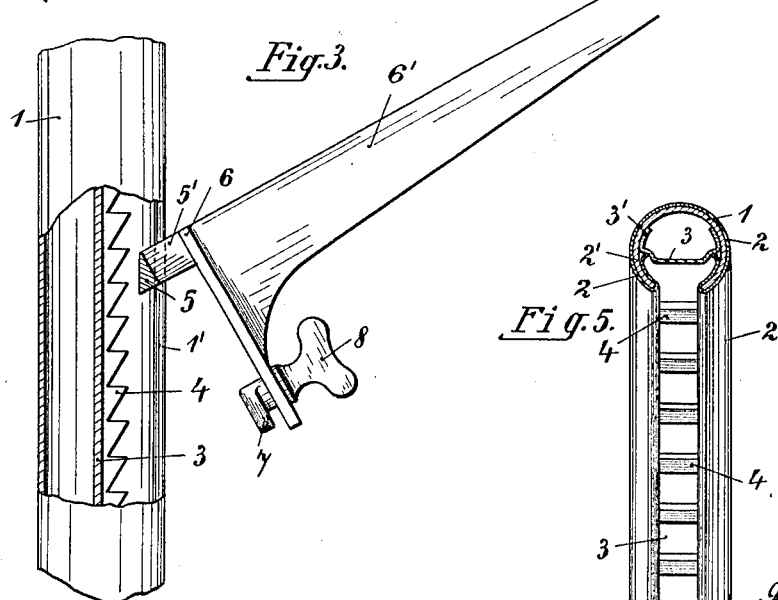
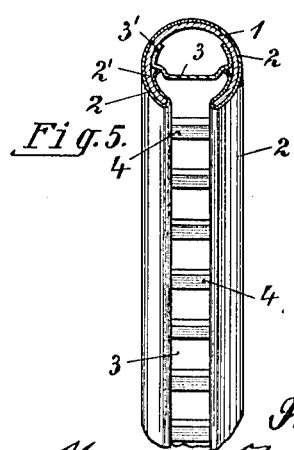

UNITED STATES PATENT OFFICE.

MAURICE FREUD, OF BERLIN, GERMANY.

SHOP-WINDOW FRAME.

1,066,806.  Specification of Letters Patent.  Patented July 8, 1913.

Application filed March 11, 1911. Serial No. 613,926.

*To all whom it may concern:*

Be it known that I, MAURICE FREUD, a subject of the German Emperor, residing at Berlin, Germany, have invented new and useful Improvements in Shop-Window Frames, of which the following is a specification.

This invention relates to shop window show frames with slotted uprights and supporting arms adjustable by means of hammer headed or wedge shaped heads. The securing of these arms has hitherto been effected by the fastening of the rotatable enlarged heads by means of nuts and screws after the securing of the enlarged heads has been effected in the transverse position. The securing and fastening of the arms was effected in the prior invention by means of the frictional pressure produced between the adjustable enlarged head and the side walls of the upright. This frictional pressure is, however, liable after long use in consequence of the wear of the heads which are usually made of soft material, to become no longer sufficient in order to keep the arms fixed in the uprights, even when they are heavily loaded. In order to obviate this drawback according to the present invention the enlarged head engaging in the slotted upright is so formed that after the turning of the arm into the horizontal position the head engages by means of a toothing in the longitudinal slot of the upright, so that even in the case of wear the enlarged head is assured of a secure attachment.

A further distinctive feature of the present invention consists in providing the tubular or the like profiled slotted uprights either at the rear wall of the groove or at the side walls thereof, with one or more projecting racks, rows of projections or perforations, which in combination with the specially formed enlarged heads of the arms to be supported by them will act as locks, which insure a reliable fixing of the supports even when they are heavily loaded.

In Figures 1 and 2 of the accompanying drawing a portion of the display frame is illustrated according to this invention, partially in side elevation and partially in section respectively in plan and in the secured position. Fig. 3 illustrates a second construction in the unsecured position. Fig. 4 is an isometric perspective view, with the upper end thereof in section, of an upright embodying a modified form of my invention. Fig. 5 is a similar view of a still further modification.

As may be seen from Figs. 1, 2 and 3, the rear 3 of the dovetailed recess of the upright 1 is provided with the rack 4 and the enlarged head 5 5' attached unrotatably to the plate 6 of the arm 6' and set transversely to the longitudinal direction of the said arm, and is formed of a prismatic body of such a shape that after the insertion in the recess and on the moving of the arm from the position illustrated in Fig. 3 into the horizontal position shown in Fig. 1, will come into contact with the rack 11, whereupon simultaneously the projection 5" placed at the lower part of the piece 6 engages in the slot 1' of the slotted upright 1 and the piece 6 rests closely against the aforesaid slot. This projection 5" can also (see Fig. 3) be replaced by a revoluble enlarged head 7 having screw surfaces and so forth which can be turned by the wing nuts 8 in the arms 6 6', which enlarged head presses in such a manner against the slotted walls at the end of a quarter turn of the enlarged head, that the arm is not only held by the engagement of the projections 5 5' with the rack 4 but is also pressed firmly with the necessary pressure and bolted. A release of the enlarged head 5 5' is effected after the release of the rotatable enlarged head 7 (Fig. 3) or of the projection 5" (Fig. 1) from the slotted part 1' by turning the arm 6 upward whereupon the enlarged head 5 is removed out of engagement of the rack 4.

The constructional form of the tubular upright illustrated in Fig. 4 comprises a tube 1 of iron or other conveniently workable material, which may be covered with a casing 2 of brass, nickel or copper. The main tube 1 has a portion of its circumference as also of the casing, pressed inward, in such a manner that a longitudinal slot-like opening is formed in the tube the rear wall 1 of which is formed of a portion of the inner tube wall, while the side walls of the groove are covered by the unbordered edges of the casing 2. Between this and the rear wall 1 of the longitudinal recess there is inserted the piece 3 provided with the projecting teeth 4, which on the insertion of the arm 6 6' (Figs. 1 and 3) engages on the one hand with the back wall 1 and on the other with the inwardly turned edges of the casing 2.

In the construction illustrated in Fig. 5 the core tube 1 is slotted and the casing 2 surrounding the tube is pressed through the slot into the interior of the tube in such a manner, that the free edges 2' of the casing project hookwise from the inner wall of the core tube. The rear of the guide slot is formed by an inserted diametrically placed partition 3, which on the one hand adheres to the bent in edges 2' of the casing 2, and on the other hand with the projections 3' against the inner wall of the core tube 1, so that any displacement of the partition 3 in the transverse direction of the core tube is prevented. The part 3 is provided with projection 4 just like the part 3 of the illustration (Fig. 4). The tubular body 1, 2 of circular section can also be replaced by a similar tube of quadrangular or polygonal section.

While I have herein shown and described specific forms of my invention I do not wish to be limited thereto except for such limitations as the claims may impart.

I claim:

1. A show frame structure comprising in combination, a tubular standard having a longitudinally disposed slot-like opening therein, a rack disposed in said tubular standard and engaging interior portions of the latter, a casing surrounding said standard and having marginal portions extending through said slot-like opening in said standard and engaging said rack to hold the same in place, and a bracket having a toothed portion adapted to engage said rack and other portions adapted to engage the exterior of said standard, substantially as described.

2. A show frame structure comprising in combination, a tubular standard having a longitudinally disposed slot therein, a rack disposed in said tubular standard and having flanges bent rearwardly into engagement with the interior of said standard, a casing surrounding said standard and having marginal portions extending through to the slot in said standard into engagement with said rack to lock the flanges of the same in engagement with said standard, and a bracket having a toothed portion adapted to engage said rack and portions adapted to engage the exterior of said standard structure, substantially as described.

In testimony whereof I affix my signature in presence of two witnesses.

MAURICE FREUD.

Witnesses:
WOLDEMAR HAUPT,
HENRY HASPER.

---

Copies of this patent may be obtained for five cents each, by addressing the "Commissioner of Patents, Washington, D. C."